United States Patent
Nakajima et al.

(10) Patent No.: US 8,955,666 B2
(45) Date of Patent: Feb. 17, 2015

(54) WORKPIECE FEEDER AND ADJUSTMENT-AND-SEPARATION APPARATUS

(75) Inventors: Kazumasa Nakajima, Kanagawa (JP); Yukihiro Hayashi, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 155 days.

(21) Appl. No.: 13/435,964

(22) Filed: Mar. 30, 2012

(65) Prior Publication Data

US 2012/0261232 A1 Oct. 18, 2012

(30) Foreign Application Priority Data

Apr. 13, 2011 (JP) ................................. 2011-089609

(51) Int. Cl.
  *B65G 47/24* (2006.01)
  *B65G 47/14* (2006.01)
  *B65G 47/256* (2006.01)

(52) U.S. Cl.
  CPC .......... *B65G 47/1414* (2013.01); *B65G 47/256* (2013.01)
  USPC ........... 198/399; 198/403; 198/410; 198/414; 209/538

(58) Field of Classification Search
  USPC ........... 198/394, 395, 398, 399, 463.1, 382.1, 198/375.1, 456, 782, 757, 763, 201, 212, 198/326, 330, 190, 335, 339, 344, 349, 400, 198/402, 403, 410, 411, 414; 209/328, 330, 209/190, 335, 339, 344, 349, 400, 402, 403, 209/410, 411, 414, 538, 539, 540, 552, 606, 209/54
  See application file for complete search history.

(56) References Cited

U.S. PATENT DOCUMENTS

| | | | | |
|---|---|---|---|---|
| 4,704,185 A | * | 11/1987 | Fischer | 156/577 |
| 5,314,055 A | * | 5/1994 | Gordon | 198/395 |
| 6,056,108 A | | 5/2000 | Buchi et al. | |
| 6,230,875 B1 | * | 5/2001 | Carlyle | 198/761 |
| 6,360,142 B1 | | 3/2002 | Miura et al. | |
| 8,452,443 B2 | * | 5/2013 | Karlsson et al. | 700/164 |
| 8,550,233 B2 | * | 10/2013 | Perroud et al. | 198/766 |
| 2009/0035119 A1 | | 2/2009 | Sugiyama et al. | |

FOREIGN PATENT DOCUMENTS

| | | |
|---|---|---|
| JP | 11-180532 | 7/1999 |
| JP | 2000-238912 | 9/2000 |
| JP | 2002-037441 | 2/2002 |
| JP | 2003-095420 | 4/2003 |
| JP | 2001-334418 | 2/2007 |
| JP | 2007-022780 | 2/2007 |
| JP | 2009-051671 | 3/2009 |

* cited by examiner

*Primary Examiner* — Ramya Burgess
*Assistant Examiner* — Lester Rushin
(74) *Attorney, Agent, or Firm* — Jordan and Hamburg LLP

(57) ABSTRACT

A workpiece feeder includes a forward stage that separates base plates from one another and adjusts the base plates into correct top-bottom orientation and a pickup unit that individually holds the separated and adjusted base plates and horizontally aligns the held base plate into correct planar posture while feeding the held base plate to a destination. The forward stage includes a stage body that has a stage surface on which the base plates are placed and is movably supported so as to shift the stage surface and a drive unit that applies separate impacts to the stage body so that the stage body moves to apply a bouncing force and a shifting force orthogonal to the bouncing force due to the separate impacts to the base plates.

10 Claims, 7 Drawing Sheets

WORKPIECE FEEDER AND ADJUSTMENT-AND-SEPARATION APPARATUS

BACKGROUND OF THE INVENTION

1. Field of the Invention

The present invention relates to a workpiece feeder for separating, adjusting, and feeding workpieces and an adjustment-and-separation apparatus used with the workpiece feeder.

2. Description of Related Art

Workpiece feeders or parts feeders are used to feed small workpieces or parts into a production line to assemble the parts into products.

A standard parts feeder employs a vibration bowl. Into the vibration bowl, many parts are charged and the vibration bowl is continuously and finely vibrated to separate and align the parts. The separated and aligned parts are conveyed to a destination.

When many parts are charged into the vibration bowl and are continuously vibrated, the parts hit and rub one another or the bowl, to create dust such as particles and contaminants.

The parts feeder using the vibration bowl is employed in a manufacturing line to manufacture, for example, head suspensions that are installed in magnetic disk drives.

Recent magnetic disk drives must drive high-density, large-capacity magnetic disks, and therefore, head suspensions for the magnetic disk drives must be clean. For this, particles or contaminants caused in the manufacturing line must be minimized.

In connection with this, Japanese Unexamined Patent Application Publications No. 2000-238912 and No. 2003-095420 propose parts feeders capable of reducing the production of particles or contaminants.

These related arts, however, are unable to prevent parts in a vibration bowl from hitting and rubbing one another or the bowl.

SUMMARY OF THE INVENTION

An object of the present invention is to provide a workpiece feeder capable of preventing workpieces from hitting or rubbing one another and an adjustment-and-separation apparatus used with the workpiece feeder.

In order to accomplish the objects, an aspect of the present invention provides a workpiece feeder for separating, adjusting, and feeding workpieces. The workpiece feeder includes an adjustment-and-separation unit that separates the workpieces from one another and adjusts the workpieces into correct top-bottom orientation by reversing incorrectly oriented ones of the workpieces and an alignment-and-feed unit that individually holds the separated and adjusted workpieces and horizontally aligns the held workpiece into correct planar posture by turning the held workpiece while feeding the held workpiece to a destination. The adjustment-and-separation unit includes a movable part that has a stage surface on which the workpieces are placed and is movably supported so as to shift the stage surface and a drive part that applies separate impacts to the movable part so that the movable part moves to produce a bouncing force and a shifting force orthogonal to the bouncing force due to the separate impacts to the workpieces and thereby carry out the separation and adjustment of the workpieces.

This aspect of the present invention does not continuously and minutely vibrate the workpieces, and therefore, the workpieces do not hit and rub one another to produce particles or contaminants.

DETAILED DESCRIPTION OF EMBODIMENTS

An embodiment of the present invention will be explained in detail with reference to the drawings. The embodiment applies separate impacts to workpieces to separate the workpieces from one another and adjust them into correct top-bottom orientation. The embodiment individually holds the separated and adjusted workpieces and horizontally aligns the held workpiece while feeding the held workpiece to a destination. With this, the embodiment prevents the workpieces from successively hitting and rubbing one another to produce particles or contaminants.

The embodiment employs a movable part and a drive part. Preferably, the drive part includes a vertical drive part to apply a single upward or vertical impact to the movable part so that a bouncing force is applied to workpieces placed on the movable part and a horizontal drive part to apply a single forward or horizontal impact to the movable part so that a shifting force is applied to the workpieces. The vertical impact and the horizontal impact comprise the separate impacts.

More preferably, the movable part has a first end serving as a fulcrum and a second end that turns around the first end. In this case, the vertical drive part applies the single upward impact to the second end of the movable part.

Figure 1:
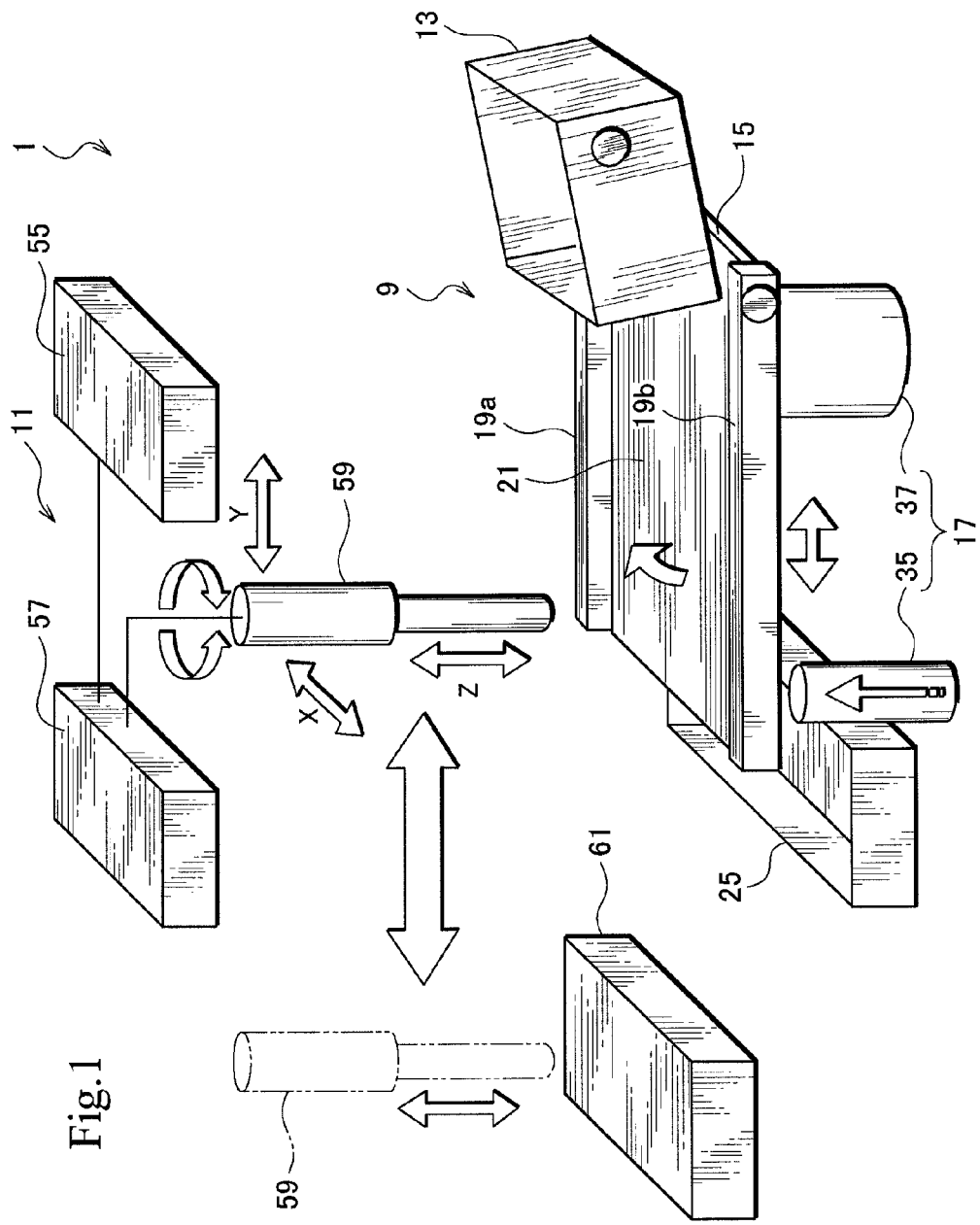
FIG. 1 is a perspective view illustrating a parts feeder according to a first embodiment of the present invention.

Hereinafter, a parts feeder 1 according to the first embodiment of the present invention will be explained in detail. FIG. 1 is a perspective view illustrating the parts feeder 1.

The parts feeder 1 is a workpiece feeder that separates workpieces from one another, adjusts postures of the workpieces, and feeds them to a destination. The parts feeder 1 is installed in, for example, a manufacturing line of head suspensions of magnetic disk drives, to feed workpieces such as base plates of the head suspensions to a destination. The parts feeder 1 is applicable to any other manufacturing lines, to adjust and feed small workpieces.

According to the first embodiment, workpieces handled by the parts feeder 1 are base plates 3. FIGS. 2A to 2D illustrate various types of base plates 3 that may be handled as workpieces by the parts feeder 1.

In FIGS. 2A to 2D, the base plate 3 has a plate-like main body 5 and an annular boss 7 protruding from a surface of the main body 5. Accordingly, top and bottom surfaces of the base plate 3 are distinguishable from each other according to the presence of the boss 7. In this embodiment, the surface on which the boss 7 is present is a top surface of the base plate 3. A barycenter of the base plate 3 including the main body 5 and boss 7 deviates toward a bottom surface of the base plate 3 from a thickness center.

Among the base plate variations illustrated in FIGS. 2A to 2D, a proper one is selected according to the size and function of a head suspension with which the base plate is used.

The parts feeder 1 for feeding the base plates 3 includes, as illustrated in FIG. 1, a forward stage 9 and a pickup unit 11.

The forward stage 9 will be explained with reference to FIG. 3 that is a side view illustrating the forward stage 9 and FIG. 4 that is a bottom view partly illustrating the forward stage 9.

The forward stage 9 serves as an adjustment-and-separation unit that separates the base plates 3 from one another and adjusts them into correct top-bottom orientation by reversing incorrectly oriented ones of the base plates 3. The forward stage 9 includes a charge box 13, a stage body 15, and a drive unit 17.

The charge box 13 is positioned at a rear end in a feed direction, to receive the base plates 3 to be handled by the parts feeder 1. The charge box 13 has a top opening through which the base plates 3 are charged. A front side of the charge box 13 in the feed direction is opened and closed to discharge a predetermined number of the base plates 3 onto the stage body 15. The front side of the charge box 13 is opened and closed under the control of a controller (not illustrated) at regular intervals of time.

The stage body 15 serves as a movable part and is a rectangular plate made of metal such as stainless steel. The stage body 15 is substantially horizontal and a longitudinal direction of the stage body 15 is in the feed direction. A first end of the stage body 15 is supported with a drive plate 27 through a shaft and is pivotable around the shaft. Namely, a second end of the stage body 15 is pivotable around the first end serving as a fulcrum.

Each side of the stage body 15 is provided with a stopper 19a (19b) that linearly extends along the side of the stage body 15 and upwardly protrudes. Between the stoppers 19a and 19b, a stage surface 21 is defined.

The stage surface 21 is a top surface of the stage body 15 onto which the base plates 3 are charged. The stage surface 21 is satin-finished or pearskin-finished by, for example, sand blasting, to have a different surface roughness from the base plates 3. According to the embodiment, the satin-finished stage surface 21 is a rougher surface than the top and bottom surfaces of the base plate 3. The stage surface 21 may be smoother than the surfaces of the base plates 3.

A bottom surface of the stage body 15 at the second end is provided with a spherical convex 23. Under the second end of the stage body 15, a gutter 25 is arranged to collect the base plates 3.

The stage body 15 is supported on a base 31 through a linear guide 29 and the drive plate 27 so that the stage body 15 is movable back and forth in the feed direction.

The drive plate 27 is arranged along and under the bottom surface of the stage body 15. A first end of the drive plate 27 has a shaft support 33 to support the shaft of the stage body 15. A second end of the drive plate 27 is positioned at a longitudinal intermediate part of the stage body 15, to expose the bottom surface of the second end of the stage body 15.

The drive plate 27 is movably supported on the base 31 through the linear guide 29. The linear guide 29 includes, for example, a guide rail and a slider that couples with and slides along the guide rail.

The drive unit 17 serves as a drive part and applies separate impacts to the stage body 15 to move the stage body 15 in such a way as to apply a bouncing force and a shifting force orthogonal to the bouncing force due to the separate impacts to the base plates 3 placed on the stage body 15. The drive unit 17 has a vertical drive unit 35 and a horizontal drive unit 37.

The vertical drive unit 35 serves as a vertical drive part and is, for example, an air cylinder that drives a rod 41 relative to a cylinder 39 with air pressure. Air to the vertical drive unit 35 is supplied by a pump (not illustrated). Between the pump and the vertical drive unit 35, an air pressure regulator (not illustrated) is arranged.

The air pressure regulator stabilizes operation of the vertical drive unit 35 and finely adjusts air pressure. The air pressure regulator and pump are controlled by the controller (not illustrated). The vertical drive unit 35 may be a hydraulic cylinder or any other mechanism.

The vertical drive unit 35 is vertically arranged under the second end of the stage body 15. When the vertical drive unit 35 extends the rod 41, a front end 41a of the rod 41 hits or shoots the spherical convex 23 of the stage body 15.

Namely, the vertical drive unit 35 knocks or pushes up the second end of the stage body 15 with a single vertical impact, thereby pivoting the stage body 15.

The vertical drive unit 35 may be provided with a cover to prevent contaminants from being produced from the vertical drive unit 35 to be pushed by the rod 41 of the vertical drive unit 35.

The horizontal drive unit 37 serves as a horizontal drive part and has a motor 43 and a cam mechanism 45.

The motor 43 is, for example, a servomotor and has an output shaft 47 for providing torque. The output shaft 47 is vertically arranged under the drive plate 27. Output of the motor 43 is controlled by the controller (not illustrated). The motor 43 may be a stepping motor, or any other motor.

The cam mechanism 45 is arranged between the output shaft 47 of the motor 43 and the drive plate 27.

Figure 3:
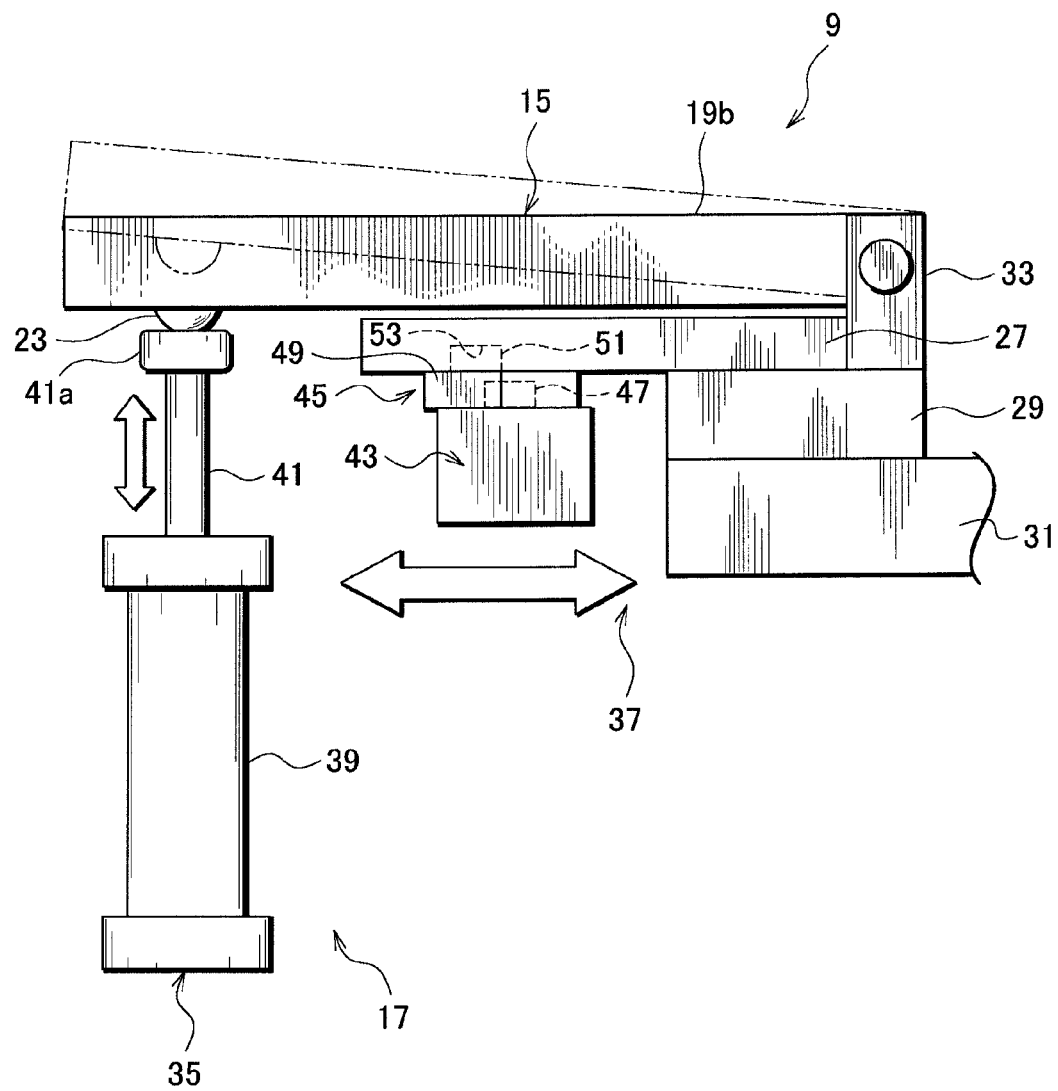
FIG. 3 is a side view illustrating a forward stage of the parts feeder of FIG. 1.
Figure 4:
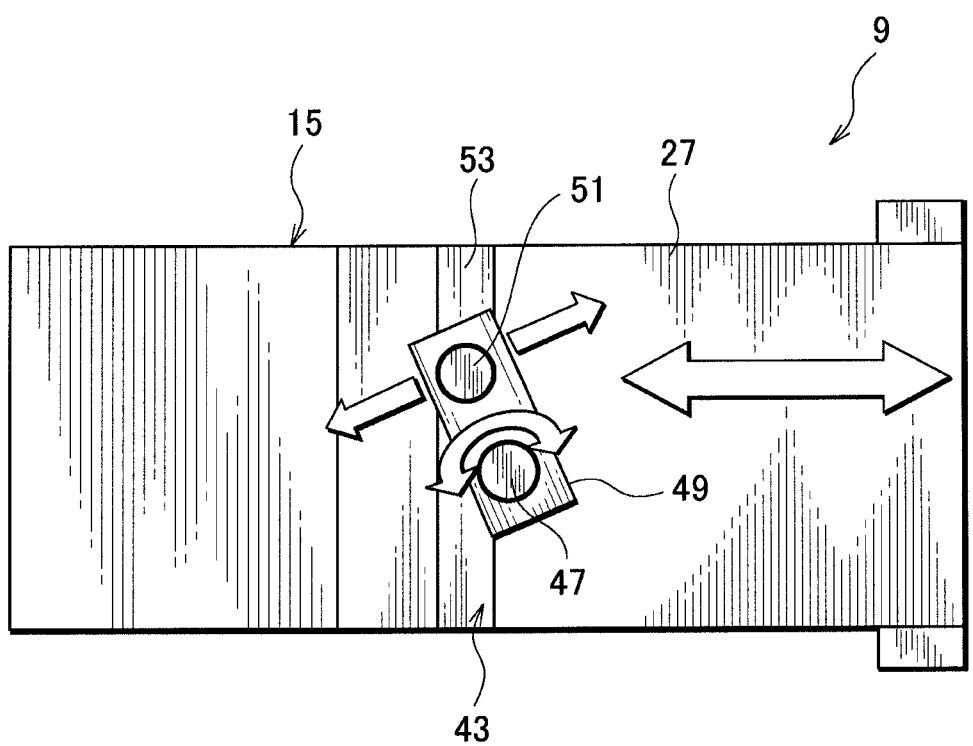
FIG. 4 is a bottom view partly illustrating the forward stage of FIG. 3.

As illustrated in FIGS. 3 and 4, the cam mechanism 45 has a cam arm 49 that is fixed to the output shaft 47 of the motor 43. A front end of the cam arm 49 is provided with a cam follower shaft 51. The cam follower shaft 51 protrudes from the cam arm 49 and a front end of the cam follower shaft 51 engages with a cam follower groove 53. The cam follower groove 53 is a recess formed in a width direction in the bottom surface of the drive plate 27.

The cam mechanism 45 is driven by the motor 43 such that the cam follower shaft 51 at the front end of the cam arm 49 turns around the output shaft 47 of the motor 43. Then, the cam follower shaft 51 slides along the cam follower groove 53, to push the cam follower groove 53 back and forth in the feed direction. Namely, the cam mechanism 45 converts the torque of the motor 43 into a horizontal shifting force to shift the drive plate 27 in the feed direction.

The horizontal drive unit 37, therefore, displaces the stage body 15 through the drive plate 27 back and forth in the feed direction. According to the embodiment, the back and forth displacement of the stage body 15 is carried out together with the pivoting movement thereof.

Like the vertical drive unit 35, the horizontal drive unit 37 may be provided with a cover to prevent contaminants from being produced from the horizontal drive unit 37.

The pickup unit 11 serves as an alignment-and-feed unit that individually holds the separated and adjusted base plates 3 and horizontally aligns the held base plate 3 into correct planar posture by turning the held base plate 3 while feeding the held base plate 3 to a destination. The pickup unit 11 includes, as illustrated in FIG. 1, an image pickup part 55, a pickup controller 57, and a pickup arm 59.

The image pickup part 55 is, for example, a CCD camera to photograph the stage surface 21 of the stage body 15 of the forward stage 9 from above. According to the embodiment, the image pickup part 55 photographs the second end side of the stage surface 21 where a pickup area is defined. The image pickup unit 55 sends a photographed image to the pickup controller 57.

The pickup controller 57 serves as a determination part and is, for example, an information processor such as a computer, to determine, according to the photographed image from the image pickup part 55, the top-bottom orientation and planar posture of each base plate 3 and whether or not the base plates 3 are overlapping one another. For this, the pickup controller 57 carries out image processing such as area segmentation and edge detection on the base plates 3 in the photographed image. According to the determination, the pickup controller 57 drives the pickup arm 59.

The pickup arm 59 serves as a hold-and-feed and is cylindrical to attract and hold the base plates 3 one by one at a distal end thereof. The pickup arm 59 is supported so that it turns around a rotation axis and three-dimensionally moves in the feed direction (Y-direction in FIG. 1), an orthogonal direction (X-direction in FIG. 1) orthogonal to the feed direction, and a vertical direction (Z-direction in FIG. 1).

The pickup arm 59 picks up and holds the base plate 3 that is correct in top-bottom orientation and is not overlapping with other base plates 3, feeds the held base plate 3 to a welding jig 61 as the destination, and turns the base plate 3 according to the determined planar posture of the base plate 3 into correct planar posture.

Operation of the parts feeder 1 will be explained. Many base plates 3 are charged into the charge box 13 of FIG. 1. The front side of the charge box 13 is opened and closed to supply a predetermined number of the base plates 3 onto the stage body 15. The predetermined number is determined so that the image processing of the base plates 3 is smoothly carried out. This predetermined number of the base plates 3 also enables to minimize contaminants when separating and adjusting the base plates 3.

On the stage body 15, the base plates 3 are separated from one another and are adjusted into correct top-bottom orientation. For this, the vertical drive unit 35 and horizontal drive unit 37 of the drive unit 17 pivot the stage body 15, and at the same time, move the stage body 15 back and forth.

To pivot the stage body 15, the rod 41 of the vertical drive unit 35 is extended to shoot or knock the stage body 15 upward to apply the single vertical impact to the stage body 15. With the single vertical impact, the stage body 15 pivots without deformation to apply a bouncing force to the base plates 3 on the stage body 15.

Figure 5A:
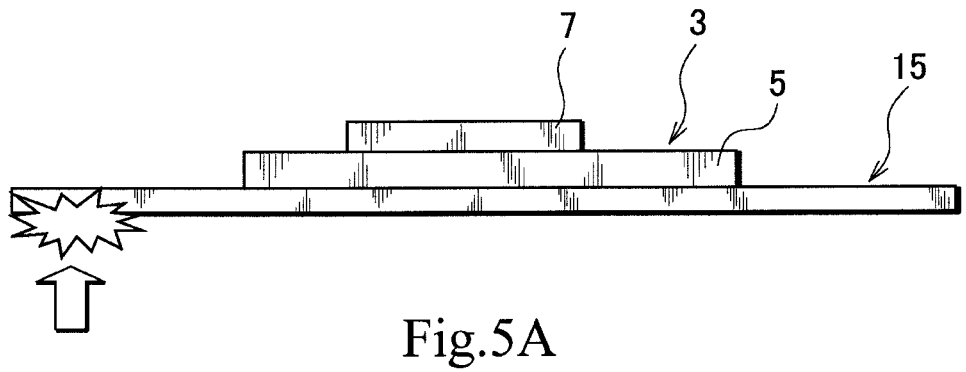
FIGS. 5A to 5C are side views illustrating behavior of a base plate placed on the forward stage when an upward impact is applied to the forward stage.
Figure 5B:
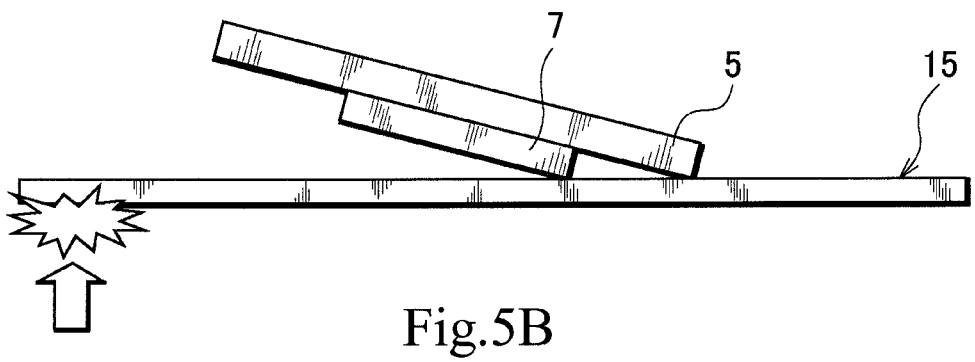
Figure 5C:
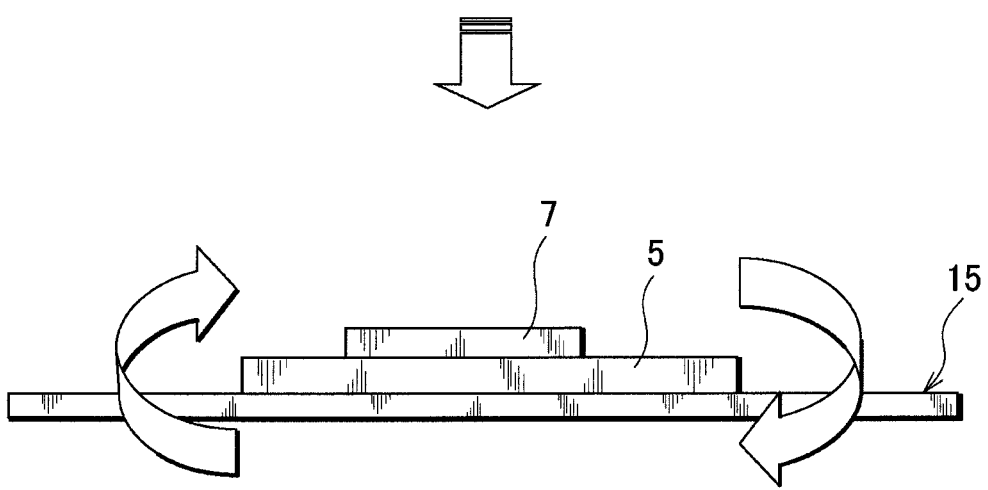

FIGS. 5A to 5C are side views illustrating behavior of the base plate 3 when an upward impact is applied to the stage body 15.

Due to the bouncing force, the base plate 3 tends to jump from the stage surface 21 of the stage body 15.

If the base plate 3 is correct in top-bottom orientation as illustrated in FIG. 5A with the top surface thereof being on top, the base plate 3 is stable because the bottom surface of the base plate 3 is entirely supported on the stage surface 21. In this case, the barycenter of the base plate 3 is low. Therefore, the base plate 3 hardly jumps from the stage surface 21, or even if it jumps, it never turns upside down.

If the base plate 3 is incorrect in top-bottom orientation as illustrated in FIG. 5B with the bottom surface thereof being on top, the base plate 3 inclines on the stage surface 21 due to the boss 7 of the base plate 3. On the stage surface 21, the base plate 3 is in a point-contact state and is unstable and the barycenter of the base plate 3 is high.

When the bouncing force is applied to the unstable base plate 3 of FIG. 5B, the base plate 3 jumps from the stage surface 21 and turns upside down according to the barycenter into correct and stable top-bottom orientation with the bottom surface of the base plate 3 being on the stage surface 21 as illustrated in FIG. 5C.

In this way, the pivoting of the stage body 15 adjusts the top-bottom orientation of the base plates 3 by the reversing the base plates 3 so that each base plate 3 is stabilized with the top surface thereof being on top.

At this time, the air pressure regulator (not illustrated) finely adjusts air pressure to drive the vertical drive unit 35, so that the top-bottom orientation of each base plate 3 is correctly adjusted.

The air pressure for driving the vertical drive unit 35 is also adjusted not to impact the stage body 15 more than necessary. This extends the service life of the parts feeder 1.

On the other hand, the motor 43 drives the horizontal drive unit 37 to move the stage body 15 back and forth to apply the single forward or horizontal impact to the stage body 15. With this, the base plates 3 on the stage body 15 receive a forward shifting force due to the single horizontal impact. The single horizontal impact comprises the separate impacts together with the single vertical impact.

When the stage body 15 is moved forward in the feeding direction by the horizontal drive unit 37, the base plates 3 on the stage surface 21 slide forward, and when the stage body 15 is moved backward, the base plates 3 stop at the slid-forward positions.

This back and forth movement separates the base plates 3 on the stage surface 21 from one another. The bouncing of the base plates 3 by the vertical drive unit 35 helps separating the base plates 3 from one another. The bouncing action, however, is less effective in separating the base plates 3 than the back and forth action achieved by the horizontal drive unit 37.

The back and forth action by the horizontal drive unit 37 applies the shifting force as also a turning force to the thrown base plates to help reversing the base plates 3 into correct top-bottom orientation when the vertical drive unit 35 throws the base plates 3 upward to adjust them into correct top-bottom orientation.

The bouncing action by the vertical drive unit 35 and the back and forth action by the horizontal drive unit 37 are sometimes insufficient to adjust the base plates 3 into correct top-bottom orientation or separate them from one another if the base plates 3 are heavily overlapping one another or are densely gathering together.

This problem is solved by repeating the bouncing action and back-and-forth shifting action several times. Some base plates 3 may be not separated from one another or not adjusted into correct top-bottom orientation even after the repetition of the bouncing and shifting actions. The incorrect base plates 3 are conveyed to the second end of the stage body 15 and dropped from there into the gutter 25 illustrated in FIG. 1. The number of times of repetition of the bouncing and shifting actions is adjusted according to a shift distance of the base plates 3 and the length of the stage body 15.

Each base plate 3 that is separated from others and is correct in top-bottom orientation is picked up by the pickup unit 11, is adjusted into correct planar posture, and is fed to the welding jig 61.

At this time, the image pickup part 55 photographs an area around the second end of the stage surface 21 of the stage body 15. The stage surface 21 is rougher than the top and bottom surfaces of the base plates 3, and therefore, the photographed image has a clear contrast between the stage surface 21 and the base plates 3.

The photographed image is transferred to the pickup controller 57, which processes the image and determines the top-bottom orientation, planar posture, and overlapping state of each base plate 3.

Figure 2A:
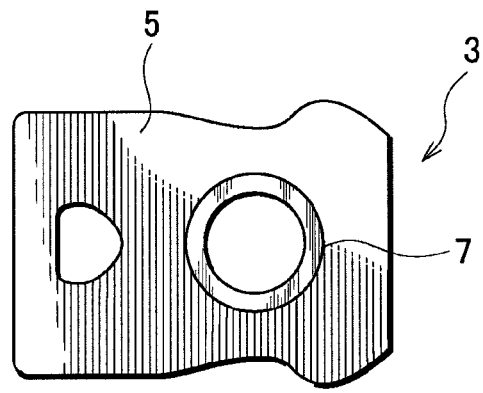
FIGS. 2A to 2D are plan views illustrating various types of base plates serving as workpieces handled by the parts feeder of FIG. 1.
Figure 2B:
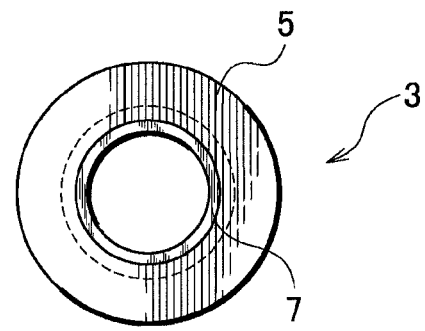
Figure 2C:
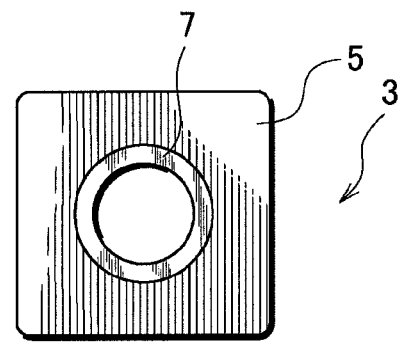
Figure 2D:
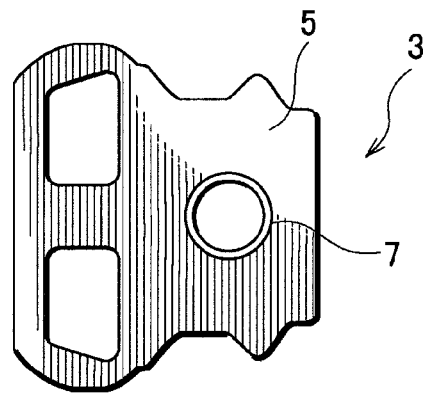
Figure 6:
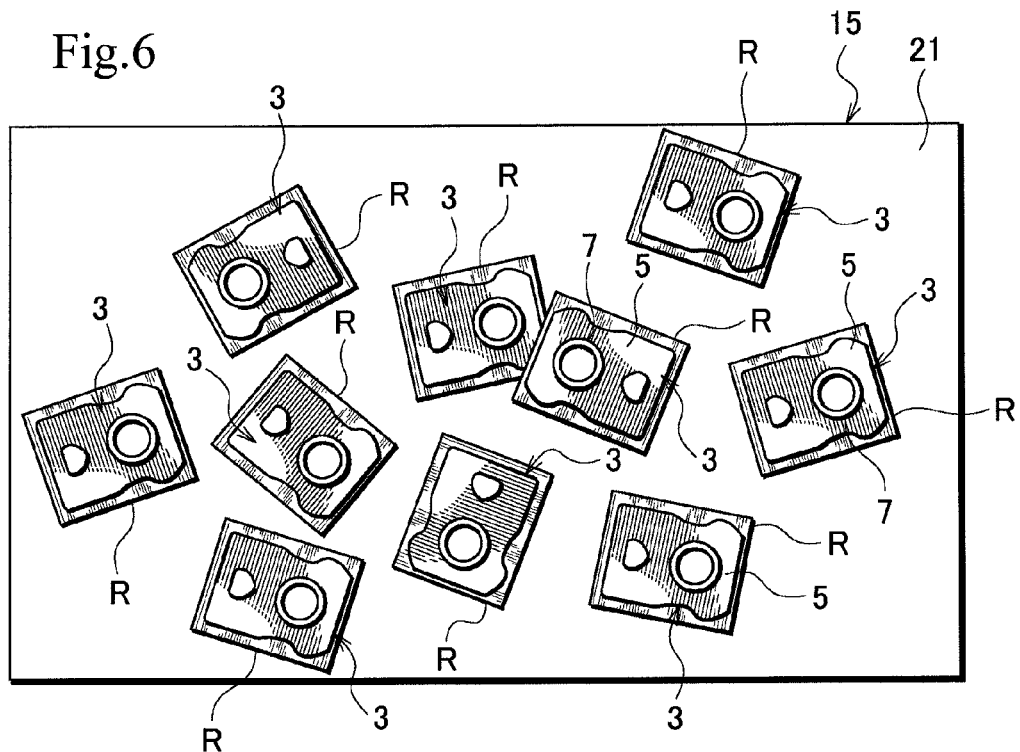
FIG. 6 is a view illustrating image processing carried out on an image of base plates.

FIG. 6 is a view illustrating image processing carried out on a photographed image of the base plates 3, each of the base plates 3 being that of FIG. 2A.

In FIG. 6, a rectangular area R is defined for each base plate 3, and in each rectangular area R, edges of the base plate 3 are extracted. Based on the processed image, the pickup controller 57 determines the top-bottom orientation of each base plate 3 according to whether or not the boss 7 is present on the base plate 3, the planar posture of the base plate 3 according to an inclination of the rectangular area R, and the overlapping state of the base plate 3 according to whether or not the rectangular area R overlaps other rectangular areas R.

If a given base plate 3 has the top surface on top and is not overlapping others, the pickup controller 57 selects the base plate 3 to be fed to the welding jig 61. The pickup controller 57 picks up and holds the base plate 3 with the pickup arm 59 and feeds the same to the welding jig 61. At this time, the pickup controller 57 turns the base plate 3 into correct planar posture through the pickup arm 59.

In this way, the parts feeder 1 according to the embodiment applies vertical and horizontal impacts to separate the base plates 3 from one another and adjust the top-bottom orientation of each base plate 3. Thereafter, the parts feeder 1 holds each base plate 3 that is separated from others and is correct in top-bottom orientation and horizontally turns the held base plate 3 to adjust its planar posture while feeding the base plate 3 to the welding jig 61.

The parts feeder 1 according to the embodiment does not continuously apply fine vibration to the base plates 3, to prevent the base plates 3 from excessively hitting and rubbing one another, thereby preventing the production of particles and contaminants.

Figure 7:
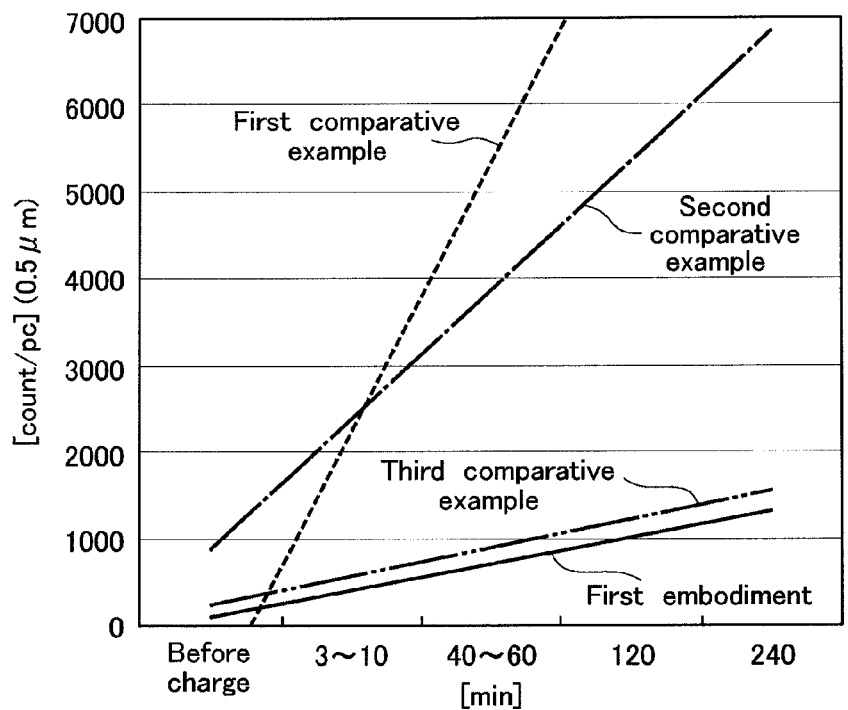
FIG. 7 is a graph illustrating results of cleanliness tests carried out on base plates handled by the first embodiment and comparative examples.

Results of cleanliness tests carried out on workpieces (base plates) will be explained. FIG. 7 is a graph illustrating results of cleanliness tests carried out on base plates handled according to the first embodiment and comparative examples. In the graph, an ordinate represents the number of particles or contaminants produced during the tests and an abscissa represent operating time (minutes) of parts feeders used in the tests.

Among the comparative examples, the first comparative example employs a vibration bowl made of stainless steel, the second comparative example employs a vibration bowl made of stainless steel coated with urethane, and the third comparative example employs a vibration bowl made of stainless steel coated with fluorine.

As is apparent in FIG. 7, the embodiment of the present invention greatly suppresses the production of contaminants compared with the first and second comparative examples. In addition, the embodiment of the present invention is more effective than the third comparative example in suppressing the production of contaminants.

The third comparative example is capable of suppressing the production of contaminants lower than the first and second comparative examples. The third comparative example, however, produces more contaminants when the fluorine coating peels off after a long time of use. Namely, the third comparative example has a problem in long-term reliability, and therefore, is inappropriate to use it in actual manufacturing.

Compared with the third comparative example, the embodiment of the present invention employs no coating, and therefore, is capable of minimizing the production of contaminants for a long time to secure long-term reliability.

Effect of the present invention will be explained. The parts feeder 1 according to the first embodiment of the present invention includes the forward stage 9 that separates base plates 3 (workpieces) from one another and adjusts the base plates 3 into correct top-bottom orientation and the pickup unit 11 that individually holds the separated and adjusted base plates 3 and horizontally aligns the held base plate 3 into correct planar posture while feeding the held base plate 3 to a destination (welding jig 61). The forward stage 9 includes the stage body 15 that has the stage surface 21 on which the base plates 3 are placed and is movably supported so as to shift the stage surface 21 and the drive unit 17 that applies separate impacts to the stage body 15 so that the stage body 15 moves to apply a bouncing force and a shifting force orthogonal to the bouncing force to the base plates 3 and thereby carry out the separation and adjustment of the base plates 3.

The parts feeder 1 applies individual impacts to separate the base plates 3 and adjust the top-bottom orientation of the base plates 3. When holding and feeding each base plate 3, the parts feeder 1 adjusts the horizontal posture of the base plate 3.

The parts feeder 1 minimizes the production of contaminants that may occur when the base plates 3 hit and rub one another. This is achievable because the parts feeder 1 applies no continuous fine vibration to the base plates 3.

The barycenter of the base plate 3 is biased toward the bottom side of the base plate 3, and therefore, only the base plate 3 whose bottom surface is on top is bounced up and reversed by the parts feeder 1 into correct top-bottom orientation.

The drive unit 17 has the vertical drive unit 35 that knocks or pushes up the stage body 15 to apply a single vertical impact to the stage body 15 so that the stage body 15 applies a bouncing force to the base plates 3 due to the single impact. The vertical drive unit 35 has a simple structure to surely apply the bouncing force to the base plates 3.

The stage body 15 is supported at the first end thereof so that the first end serves as a fulcrum to pivot the second end of the stage body 15 when the vertical drive unit 35 knocks or pushes the second end of the stage body 15 upward. This configuration is simple.

The drive unit 17 also has the horizontal drive unit 37 that moves back and forth the stage surface 21 of the stage body 15 to apply a single horizontal impact to the stage body 15 so that the stage body 15 applies a shifting force to the base plates 3 placed on the stage surface 21. The horizontal drive unit 37 surely shifts the base plates 3 along the stage surface 21.

The parts feeder 1 simultaneously drives the vertical drive unit 35 and horizontal drive unit 37, to knock up and move back and forth the stage body 15. This surely reverses the base plate 3 thrown by the stage body 15 upward and shortens a time to separate and adjust the base plates 3.

The thrusting and shifting actions of the stage body 15 may be carried out with a time difference between them. Even with the time difference, the parts feeder 1 can speedily and surely separate and adjust the base plates 3.

The pickup unit 11 has the image pickup part 55 to photograph the stage surface 21 of the stage body 15, the pickup controller 57 to determine, according to the image photographed by the image pickup part 55, the top-bottom orientation and planar posture of each base plate 3, and the pickup arm 59 to hold the base plate 3 that is determined to be correct in top-bottom orientation and turn the held base plate 3 according to the determined planar posture into correct planar posture while feeding the held base plate 3 to the welding jig 61.

The embodiment, therefore, adjusts the planar posture of only the base plate 3 that is correctly separated from others and is correct in top-bottom orientation and feeds the adjusted base plate 3 to the welding jig 61. Accordingly, the base plate 3 fed to the welding jig 61 is correctly positioned on the welding jig 61.

Based on the photographed image, the pickup controller 57 determines whether or not a given base plate 3 is overlapping others and the pickup arm 59 carries only the base plate 3 that is separated from others and is correct in top-bottom orientation.

To shorten an operation time, the embodiment carries out no special operation onto the base plates 3 that are overlapping one another. Only by repeating the separation and adjustment actions, the embodiment separates the overlapping base plates from one another.

The stage surface 21 of the stage body 15 has a different surface roughness from the base plates 3. According to the embodiment, the stage surface 21 of the stage body 15 is satin-finished and is rougher than the top and bottom surfaces of the base plates 3.

The image pickup part 55, therefore, is able to pick up an image of the base plates 3 that has a clear contrast between the base plates 3 and the stage surface 21. This reduces image processing load and surely determines the attitude of each base plate 3.

A parts feeder according to a modification of the first embodiment will be explained with reference to FIG. 8.

Figure 8:
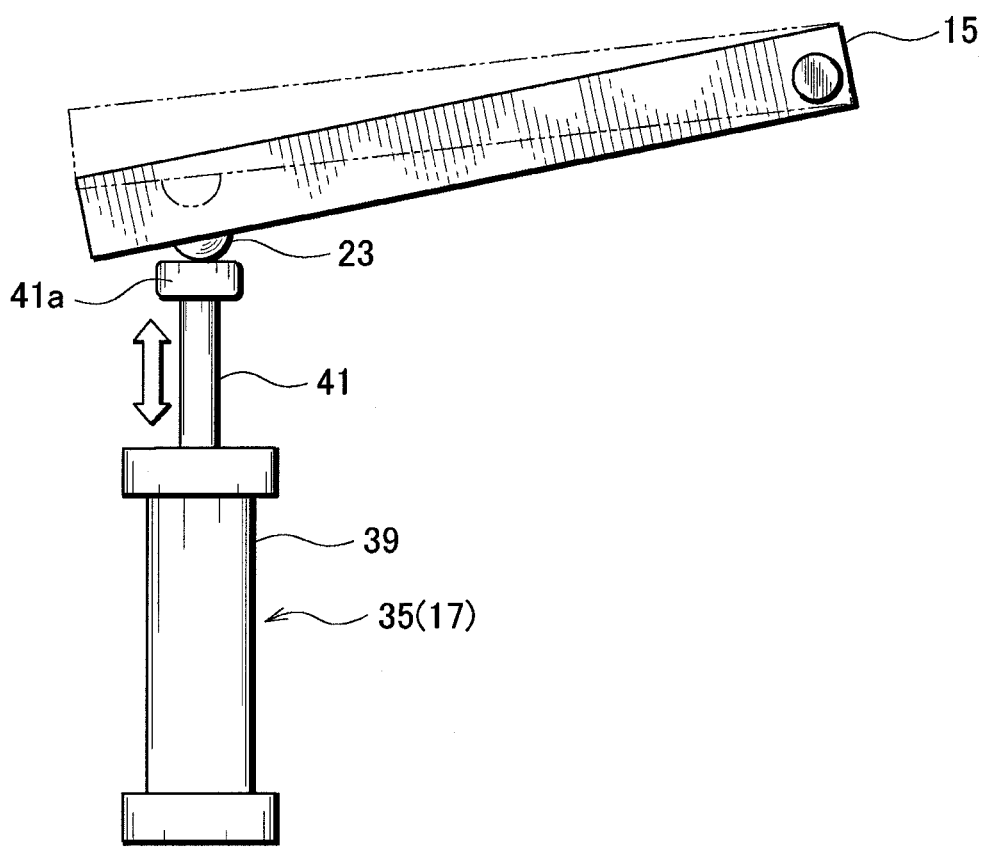
FIG. 8 is a side view partly illustrating a forward stage of a parts feeder according to a modification of the first embodiment of the present invention.

The parts feeder 1 according to the modification has a stage body 15 that is inclined as illustrated in FIG. 8.

When a vertical drive unit 35 of the parts feeder 1 knocks or pushes up the stage body 15 with a single shot, the stage body 15 receives separate impacts as vertical and horizontal component forces caused by the single shot to apply both a bouncing force and a shifting force to workpieces (base plates) placed on the stage body 15. Accordingly, the modification can omit the horizontal drive unit 37 of the first embodiment, to simplify the structure of the parts feeder 1.

Even the modification provides the same effect as the first embodiment.

Although the present invention has been explained with reference to the embodiment and modification, the present invention is not limited to them and allows various alterations.

For example, the rod 41 of the vertical drive unit 35 may be coupled with the bottom surface of the stage body 15, to drive the stage body 15 without knocking or throwing it upward. In this case, the vertical drive unit 35 is so set as to generate acceleration similar to that of the first embodiment so that the base plates 3 placed on the stage body 15 receive a similar bouncing force.

Instead of pivotally supporting the stage body 15, the stage body 15 may be supported such that the stage body 15 as a whole is vertically movable.

Like the vertical drive unit 35, the horizontal drive unit 37 may be configured to horizontally shoot the stage body 15. In this case, a resilient member is arranged to return the stage body 15 to an initial position.

The stage body 15 may be supplementarily vibrated widthwise in addition to the back-and-forth action, to more effectively separate the base plates 3 placed on the stage body 15 from one another.

The embodiment simultaneously carries out the thrusting action by the vertical drive unit 35 and the back-and-forth action by the horizontal drive unit 37 with respect to the stage body 15. These actions by the vertical drive unit 35 and horizontal drive unit 37 may be carried out separately. For example, one of the actions may be carried out after the completion of the other.

The embodiment handles, as a workpiece, the base plate 3 whose barycenter is biased toward the bottom side thereof. The present invention is applicable to handle a workpiece whose barycenter is present at a center in the thickness direction thereof.

What is claimed is:

1. A workpiece feeder for separating, adjusting, and feeding workpieces, comprising:
    an adjustment-and-separation unit that separates the workpieces from one another and adjusts the workpieces into correct top-bottom orientation by reversing incorrectly oriented ones oaf the workpieces; and
    an alignment-and-feed unit that individually holds the separated and adjusted workpieces and horizontally aligns the held workpiece into correct planar posture by turning the held workpiece while feeding the held workpiece to a destination,
    the adjustment-and-separation unit including a base, a movable part having a stage surface on which the workpieces are placed and being movably supported with the base so as to shift the stage surface, and a drive part that applies separate impacts to the movable part so that the movable part moves to apply a bouncing force and a shifting force orthogonal to the bouncing force due to the separate impacts to the workpieces and thereby carry out the separation and adjustment of the workpieces,
    wherein the movable part has a first end that is pivotally supported with the base and a second end turnable around the first end with respect to the base, and
    wherein the drive part is arranged under the movable part to upwardly hit a bottom surface of the second end of the movable part and upwardly turn the second end of the movable part around the first end of the movable part with respect to the base.

2. The workpiece feeder of claim 1, wherein the drive part includes a horizontal drive part that moves the movable part hack and forth along the stage surface to apply a single impact to the movable part, to produce the shifting force.

3. The workpiece feeder of claim 2, wherein the drive part simultaneously achieves the pushing up of the movable part by a vertical drive part and the back-and-forth movement of the movable part by the horizontal drive part.

4. The workpiece feeder of claim 1, wherein the alignment-and-feed unit includes
    an image pickup part that photographs the stage surface of the movable part with the workpieces placed on the stage surface,
    a determination part that determines, according to the image photographed with the image pickup part, the top-bottom orientation and planar posture of each workpiece, and
    a hold-and-feed part that holds a workpiece determined by the determination part to be correct in top-bottom orientation, turns the held workpiece into correct planar posture according to the planar posture determined by the determination part, and feeds the held workpiece to the destination.

5. The workpiece feeder of claim 4, wherein the determination part determines, according to the photographed image, an overlapping state among the workpieces and the hold-andfeed part holds and feeds any workpiece that is determined to be correct in top-bottom orientation and separated from other workpieces.

6. The workpiece feeder of claim 4, wherein the stage surface of the movable part has a different surface roughness from the workpieces.

7. The workpiece feeder of claim 6, wherein the stage surface of the movable part is satin-finished and has a rougher surface roughness than the workpieces.

8. The workpiece feeder of claim 1, wherein the workpieces each are a plate-like workpiece whose center of gravity is biased toward one of the top and bottom sides thereof.

9. The workpiece feeder of claim 1, wherein the workpieces each are a base plate of a head suspension provided with a magnetic head and the base plate has a plate-like body and an annular boss protruding from a surface of the plate-like body.

10. An adjustment-and-separation apparatus used with a workpiece feeder for separating and attitude-adjusting a plurality of workpieces, comprising:

a base;

a movable part having a stage surface on which the workpieces are placed and being movably supported with the base so as to shift the stage surface; and a drive part that applies separate impacts to the movable part so that the movable part moves to apply a bouncing force and a shifting force orthogonal to the bouncing force due to the separate impacts to the workpieces, thereby separating the workpieces from one another and reversing incorrectly oriented ones of the workpieces into correct top-bottom orientation; and wherein the movable part has a first end that is pivotally supported with the base and a second end turnable around the first end with respect to the base, and wherein the drive part is arranged under the movable part to upwardly hit a bottom surface of the second end of the movable part and upwardly turn the second end of the movable part around the first end of the movable part with respect to the base.

* * * * *

UNITED STATES PATENT AND TRADEMARK OFFICE
CERTIFICATE OF CORRECTION

| | | |
|---|---|---|
| PATENT NO. | : 8,955,666 B2 | Page 1 of 1 |
| APPLICATION NO. | : 13/435964 | |
| DATED | : February 17, 2015 | |
| INVENTOR(S) | : Kazumasa Nakajima et al. | |

It is certified that error appears in the above-identified patent and that said Letters Patent is hereby corrected as shown below:

In the Claims

Claim 1, column 10, line 19, should be corrected as follows:

from "oriented ones oaf the workpieces; and"

to --oriented ones of the workpieces; and--

Claim 2, column 10, line 44, should be corrected as follows:

from "hack and forth along the stage surface to apply a single impact"

to --back and forth along the stage surface to apply a single impact--

Signed and Sealed this
Sixteenth Day of June, 2015

Michelle K. Lee
*Director of the United States Patent and Trademark Office*